United States Patent
Sun et al.

(10) Patent No.: US 10,860,077 B2
(45) Date of Patent: Dec. 8, 2020

(54) POWER SUPPLY CONTROL FOR PLUGGABLE MODULES IN A NETWORKING NODE

(71) Applicant: ARRIS Enterprises LLC, Suwanee, GA (US)

(72) Inventors: Zhijian Sun, Avon, CT (US); Brent Arnold, Doylestown, PA (US); Zoran Maricevic, West Hartford, CT (US)

(73) Assignee: ARRIS Enterprises LLC, Suwanee, GA (US)

( * ) Notice: Subject to any disclaimer, the term of this patent is extended or adjusted under 35 U.S.C. 154(b) by 111 days.

(21) Appl. No.: 16/163,566

(22) Filed: Oct. 17, 2018

(65) Prior Publication Data

US 2020/0125153 A1    Apr. 23, 2020

(51) Int. Cl.
*G06F 1/28* (2006.01)
*G06F 1/26* (2006.01)

(52) U.S. Cl.
CPC . *G06F 1/28* (2013.01); *G06F 1/26* (2013.01)

(58) Field of Classification Search
CPC .............. G06F 1/26; G06F 1/266; G06F 1/28
See application file for complete search history.

(56) References Cited

U.S. PATENT DOCUMENTS

| 2002/0003740 A1* | 1/2002 | Chang | G06F 1/26 365/226 |
| 2007/0218741 A1* | 9/2007 | Langgood | H01R 13/62988 439/328 |
| 2012/0230700 A1* | 9/2012 | Cafiero | G02B 6/4201 398/138 |

OTHER PUBLICATIONS

"Small Form-Factor Pluggable (SFP) Transceiver Multisource Agreement (MSA)", Cooperation Agreement for Small Form-Factor Pluggable Transceivers, Agilent Technologies et al., Sep. 14, 2000, 38 pages.

Bamford, Harold et al., "SFP-RF: Interface Specifications for an RF-Modulated Small Form Factor Pluggable Optical Module", Society of Cable Telecommunications Engineers, 2013, 63 pages, Exton, PA.

Bamford, Harold et al.,"Interface Specifications for an RF-Modulated Small Form Factor Pluggable Optical Receiver Module (SFP-RF-USRx)", Society of Cable Telecommunications Engineers, 2013, 52 pages, Exton, PA.

"SFP+ 10Gbps Interconnect System" Features and Specifications product sheet, Molex, 2008, 4 pages, Lisle, IL.

\* cited by examiner

*Primary Examiner* — Glenn A. Auve
(74) *Attorney, Agent, or Firm* — Chernoff, Vilhauer, McClung & Stenzel, LLP

(57) ABSTRACT

In one embodiment, a computing device detects a module that is inserted into a first slot. The computing device includes a first slot to operate with a first type of module and a second slot to operate with a second type of module. The first slot and the second slot include a same pin position for receiving a power supply pin from the first type of module and the second type of module. The module is communicated with to determine whether the module is the first type of module or the second type of module. The first type of module receives a first type of signal that is combined with a second type of signal from the second type of module. The computing device adjusts a power supply voltage to the power supply pin of the first slot from a first value to a second value when the first type of module is detected.

20 Claims, 6 Drawing Sheets

POWER SUPPLY CONTROL FOR PLUGGABLE MODULES IN A NETWORKING NODE

BACKGROUND

In a network implementation, a physical (PHY) device can be located in the headend and converts packets on a digital interface, such as an Ethernet interface, to analog signals, such as radio frequency (RF) signals, on a hybrid fiber coaxial (HFC) network. The physical device sends the RF signals to modems located at a subscriber's premises. However, other implementations, such as a distribution access architecture (DAA), have moved the physical device to a location closer to the subscriber's premises, such as in a node located in the neighborhood where the subscribers are located. The relocated physical device is referred to as a remote physical device (RPD).

The DAA in the longer term may replace analog fiber with Internet protocol (IP) digital connections. However, many cable operators in the shorter term and in the early DAA deployment, envision an analog radio frequency (RF) overlay on top of the digital connections (e.g., the digital optical links) to continue to leverage the already-deployed analog broadcast channel assets (e.g., analog network deployments). Digital optical links are typically implemented via multi-source agreement (MSA) compliant digital small form pluggable (SFP) optical transceiver modules. Analog overlay solutions for DAA deployments also may leverage standard packaging design used in the MSA-compliant digital SFP optical transceiver modules. For example, an analog SFP transceiver module may look similar to the digital SFP transceiver module when viewed by a user. Further, both the digital and analog SFP modules leverage MSA specifications, such as a similar physical pin-out between a digital SFP module and analog SFP module may be similar or exactly the same. Also, both the digital SFP module and analog SFP module may use the same pin to receive a power supply voltage, such as pin #16. However, the digital SFP module and analog SFP module may use different power supply voltages, such as the analog SFP module may use a +5 volt (V) power supply voltage and the digital SFP module may use a +3.3V power supply voltage. Because the analog SFP module and digital SFP module may use the same pin for the power supply, when a digital SFP module is inadvertently inserted into an analog SFP module slot, the digital SFP module will be immediately damaged due to the +5V power supply being provided to the digital SFP module instead of the +3.3V power supply.

DETAILED DESCRIPTION

Described herein are techniques for a power supply control system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

Some embodiments control a power supply voltage being applied to a slot in a node based on the type of module that is inserted into the slot. For example, the slot may be configured to receive a first type of module, such as an analog small-form pluggable (SFP) module. The analog SFP module may be configured to operate with a first power supply voltage, such as a +5V power supply. In some embodiments, a processor for the node may set the default power supply voltage to a second power supply voltage that is different from the first power supply voltage. For example, a lower power supply voltage, such as a +3.3V power supply voltage, may be set as the default power supply voltage to apply to the slot. The +3.3V power supply voltage may be the voltage that a second type of SFP module, such as a digital SFP module, is configured to use or may be a voltage that will not damage the digital SFP module. Thus, if a digital SFP module is accidentally plugged into the slot, the digital SFP module will not be damaged by the power supply voltage of 3.3V. However, if a +5V power supply voltage is being applied to the power supply pin of the digital SFP module, the voltage would damage the digital SFP module because the digital SFP module is not configured to operate with a +5V voltage. The higher voltage could damage some components of the digital SFP module.

To control the power supply voltage, when a module is inserted into a slot of the node, the processor detects the insertion of the module. Then, the processor communicates with the module to determine which type of module has been inserted into the slot. For example, the processor may receive information from the module and use the information to determine whether the module is a digital SFP module or an analog SFP module. Then, the processor may determine the appropriate power supply voltage for the module. For example, the processor can use the +3.3V power supply voltage for a digital SFP module and a +5V power supply voltage for an analog SFP module.

The processor adjusts the power supply voltage being supplied to the power supply pin of the slot to +5V when the analog SFP is detected. However, if the digital SFP module has been inserted into the slot, the processor does not change the power supply voltage.

Figure 1:
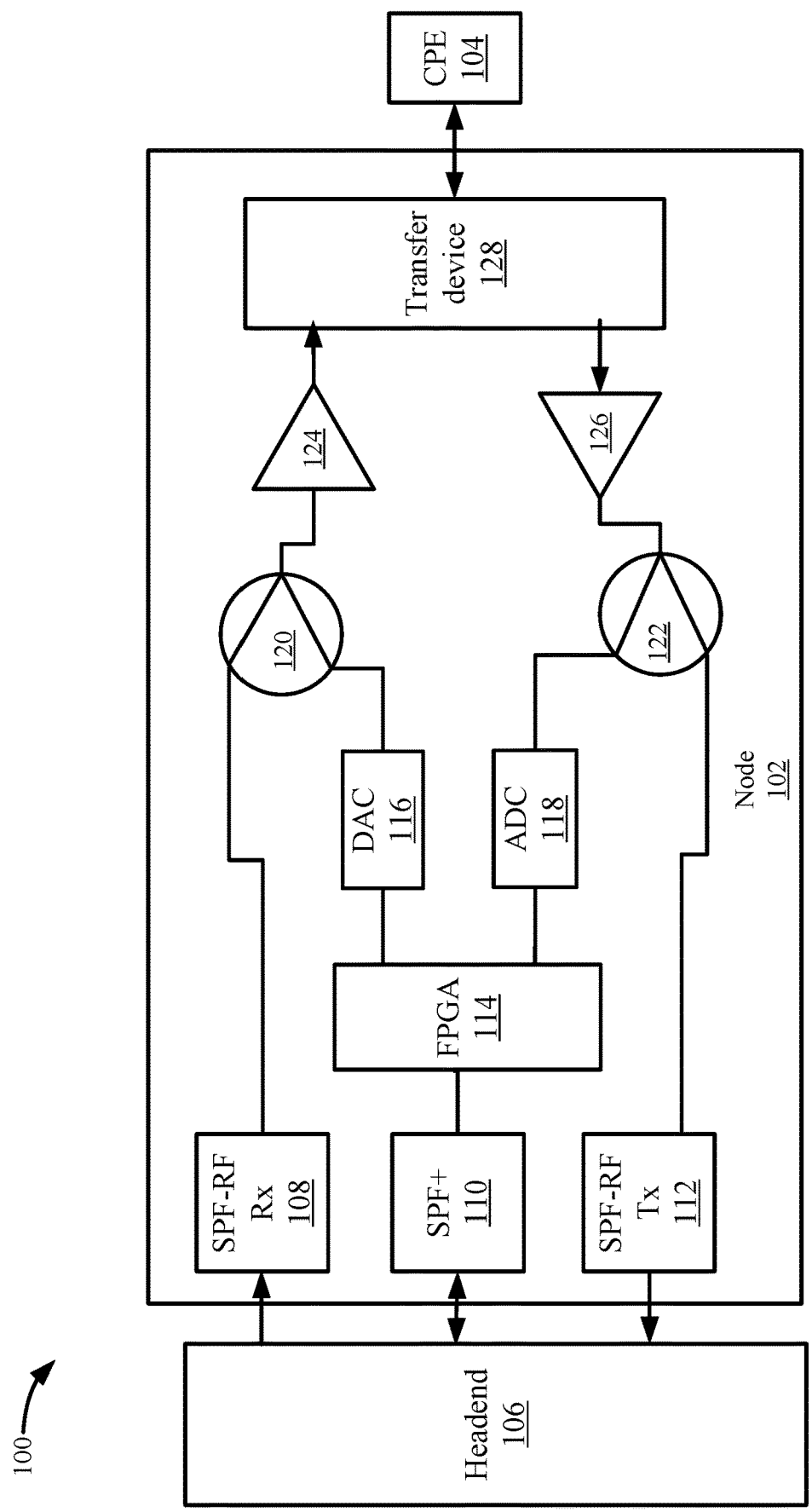
FIG. 1 depicts a simplified system for a network in which a power supply voltage is controlled according to some embodiments.

FIG. 1 depicts a simplified system 100 for a network in which a power supply voltage is controlled according to some embodiments. System 100 includes a headend 106, a node 102, and customer premise equipment (CPE) 104. Headend 106 and node 102 may be separated by a network, such as a digital network, (e.g., an Ethernet or an optical network) and/or analog network (e.g., a radio frequency (RF) network). Node 102 may be located closer to the premises of a subscriber compared to headend 106. The premises of the subscriber includes a network device, such as a CPE 104 (e.g., a cable modem, subscriber device, set-top-box, gateway, etc.). Although this architecture is described, other distributed architectures may be used. Further, the components of node 102 could be located in headend 106.

In a downstream direction, headend 106 sends a digital signal over a digital medium, such as Ethernet or a passive optical network (PON), to node 102. The digital signal is received as electrical signals at a remote physical device in node 102. The remote physical device may be considered the node 102 or be part of node 102 and include the components shown. However, for discussion purposes, the term node 102 will be used. Node 102 converts the digital signal to an analog signal, such as a radio frequency (RF) signal.

Node 102 may also receive an analog signal from headend 106 over an analog medium. Node 102 may then combine the analog signal from the analog medium with the analog signal that was converted from the digital signal from the digital medium. Node 102 sends the combined analog signal (e.g., an RF signal) over an analog medium, such as a coaxial network, to CPE 104.

In an upstream direction, CPE 104 may also transmit an analog signal to node 102 via the analog medium. The analog signal may include portions for transmission through both the digital medium and the analog medium to headend 106. Node 102 then converts at least a portion of the analog signal to a digital signal and sends the digital signal to headend 106 through the digital medium. Additionally, node 102 sends at least a portion of the analog signal to headend 106 through the analog medium.

The processing of the analog signal and digital signal within node 102 will now be discussed in more detail. Different SFP modules may be used to receive and transmit digital and analog signals. An SFP module is a module that can be inserted into a slot in node 102. Although small form pluggable modules are described, other types of modules that can be inserted into areas of node 102 may be used. A first SFP module is configured to receive and send a digital signal and a second SFP module is configured to receive, process, and send an analog signal. In some examples, an analog SFP module cannot receive, process, and send a digital signal, and a digital SFP module cannot receive and send an analog signal.

In the downstream direction, node 102 may receive an analog signal at an analog SFP receiver, such as an SFP-RF receiver (Rx) 108. Node 102 may also receive a digital signal at a digital SFP transceiver, such as an SFP transceiver 110. The digital SFP may be a regular SFP or enhanced SFP+ and may send digital signals both upstream and downstream. A regular digital SFP may support a first amount of gigabits (Gbits) per second of communication. An enhanced SFP (SFP+) may be an enhanced version of the SFP and may support data rates that are higher than the regular SFP, such as 16 Gbit/s. Although the enhanced version will be used for discussion purposes, other SFP types may also be appreciated.

The digital signal is processed by a field programmable gate array (FPGA) 114 that sends the digital signal to a digital to analog converter (DAC) 116 that converts the digital signal to an analog signal. The analog signal from SFP-RF Rx 108 and the digital signal from DAC 116 may be combined in a combiner 120. The analog signal is overlaid with the digital signal in the combined analog signal output by combiner 120. The combined signal may then be amplified by an amplifier 124 and transferred through a device 128 that can then output the analog signal to CPE 104. Transfer device 128 can combine an upstream signal with downstream signal. For example, device 128 may be a diplexer filter that can multiplex signals from two ports to a single port, such as the upstream bandwidth is from 5 to 42 or 85 MHz, and downstream is from 54 or 108 MHz to 0.12 GHz. Also, device 128 may be a coupler that can couple either the upstream signal or the downstream signal in either direction.

In the upstream direction, CPE 104 may transmit an analog signal to node 102. Transfer device 128 sends the analog signal to amplifier 126 for amplification. The analog signal is input into a splitter 122. The analog signal includes a digital portion and an analog portion that may be split at splitter 122. The analog portion is sent to an analog SFP transmitter, such as SFP-RF transmitter (Tx) 112. SFP-RF Tx 112 then sends the analog signal to head end 106.

For the digital portion of the upstream signal, an analog-to-digital converter (ADC) 118 receives the digital portion of the upstream signal and converts the analog signal to digital. FPGA 114 receives the digital signal and provides the digital signal to digital SFP 110. SFP 110 can then send the digital signal to head end 106.

Although the above network configuration is described, it will be understood that other network configurations may be used. Also, other components not shown in node 102 may also be used to process the analog and digital signals.

Figure 2:
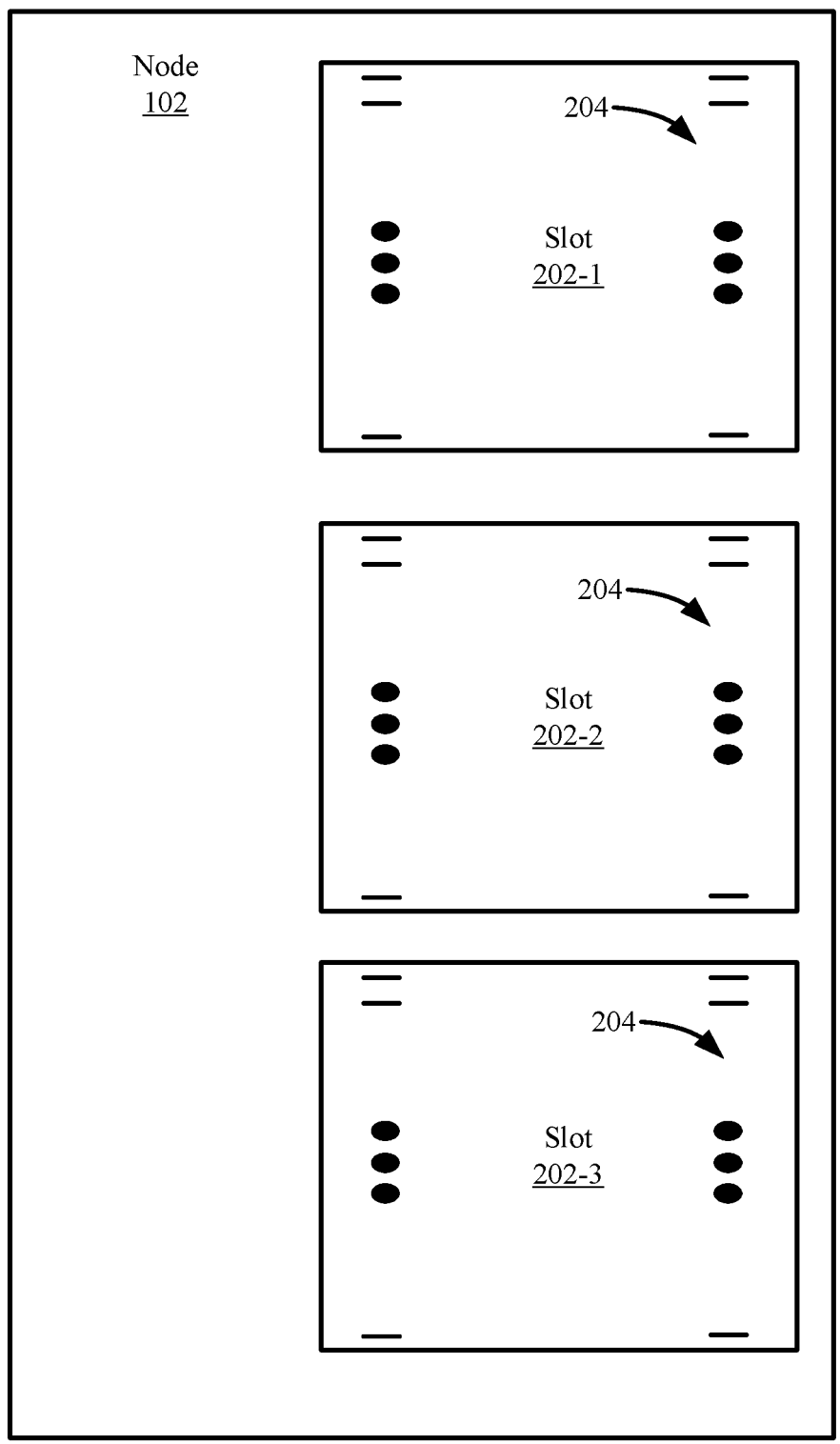
FIG. 2 depicts a more detailed example of a node according to some embodiments.

FIG. 2 depicts a more detailed example of node 102 according to some embodiments. Node 102 includes multiple slots 202-1 to 202-3. Although three slots are shown, node 102 may have a different number of slots, such as 2 slots, 4 slots, 5 slots, etc. Slots 202-1 to 202-3 may be specifically configured to operate with a specific type of SFP module. In some examples, slot 202-1 is configured to operate with SFP-RF Rx 108; slot 202-2 is configured to operate with digital SFP+ 110; and slot 202-3 is configured to operate with SFP-RF Tx 112. By operate, each slot when receiving the correct SFP module, can communicate data appropriately in the upstream and/or downstream directions. When a wrong SFP module is inserted into a slot 202, that module will not process and transmit signals in node 102 properly. For example, a digital SFP module that is inserted into an analog SFP module slot will not properly process and transmit the analog signal that is received at that slot. Although this configuration is described, other configurations of slots may be appreciated.

Each slot 202 includes pin connectors 204 in which pins from an SFP module can be coupled, such as inserted. Pin connectors may be individual connection points that can receive and connect to pins of SFP modules. In some examples, the pin layout dimensions for each slot 202-1 to 202-3 is similar or the same. The same may be using identical dimensions when designing the pin layout. The pin layout may be the same dimension-wise, such as the pin connectors are in the same position in the layout, such as in the same spacing arrangement. The connectors are the same in that they can fit both the analog SFP module and the digital SFP module. That is, the number of the pins and layout of the pins and spacing of the pins can receive either the pins of the analog SFP module or the digital SFP module. Further, the connectors may be configured to receive the same type of pins. That is, at least a portion of the pins may be configured to perform similar functions, such as both the analog SFP module and the digital SFP module have a power supply pin in the same position. The packaging of the analog SFP module or the digital SFP module may also look similar. That is, a design of both packages may use similar or the same specifications.

Figure 3:
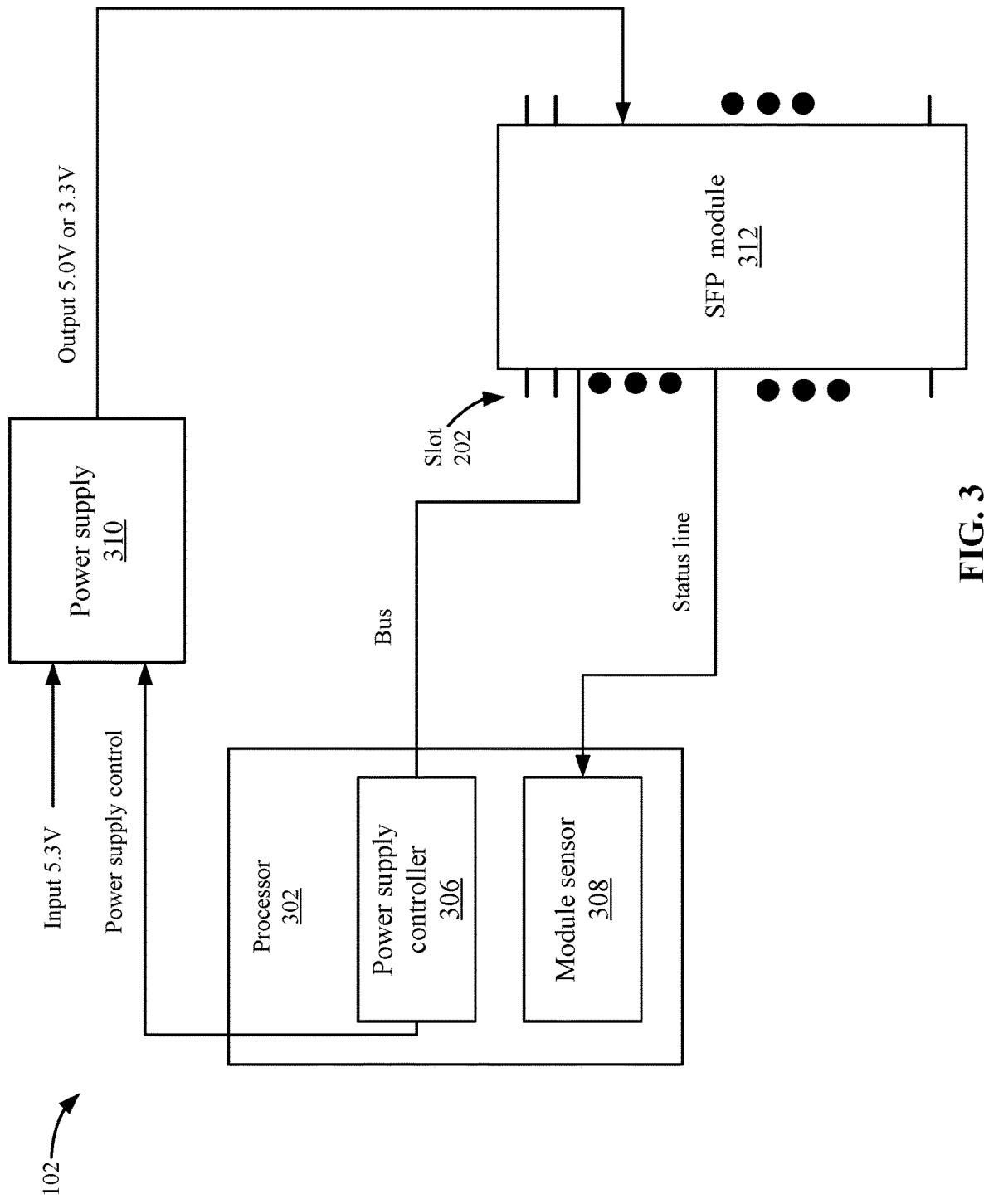
FIG. 3 depicts another more detailed example of the node according to some embodiments.

FIG. 3 depicts a more detailed example of node 102 according to some embodiments. A processor 302 may configure FPGA 114, DAC 116, ADC 118, transfer device 128, and other components in node 102 based on different requirements. Some embodiments leverage processor 302 to adjust a power supply voltage based on what type of SFP module is inserted into a slot. For example, processor 302 is configured to communicate with an SFP module 312 that has been inserted into a slot 202. Processor 302 controls a power supply 310 that can output a first power supply voltage or a second power supply voltage, such as a 5.0V or 3.3V power supply voltage, based on which type of SFP module has been inserted into slot 202. The described process may be performed for each slot that is configured to receive an analog SFP module.

When SFP module 312 is inserted into slot 202, processor 302 senses the insertion via a status line. For example, the status line may be a MOD ABS line that senses when a SFP module 312 is inserted into a slot 202. In some examples, the status line is coupled to a pin connector #6, and SFP module 312 sends a signal through the status line to a module sensor 308. The signal indicates to module sensor 108 that an SFP module has been inserted into slot 202.

Module sensor 308 detects the insertion and causes a power supply controller 306 to determine which power supply voltage to supply to SFP module 312. In some examples, power supply controller 306 communicates through a bus, such as an I2C bus that is connected to a connector of slot 202 and pin of SFP module 312. In some examples, the bus is connected to a pin #3 of SFP module 312. Through the communication, power supply controller 306 may receive information regarding the type of SFP module 312 along with other information. For example, SFP module 312 may send information in an address space of the bus, which may be divided into lower and upper 128 bytes. SFP module 312 may send the information in one part of the address space, such as the lower 128 bytes of the address space. The information may include the SFP type (e.g., whether the SFP module 312 is a digital SFP/SFP+ module or an analog SFP module). Other information may include the name of the SFP manufacturer and bias voltage, such as whether the SFP module 312 requires a power supply voltage of 5V or 3.3V.

Figure 4:
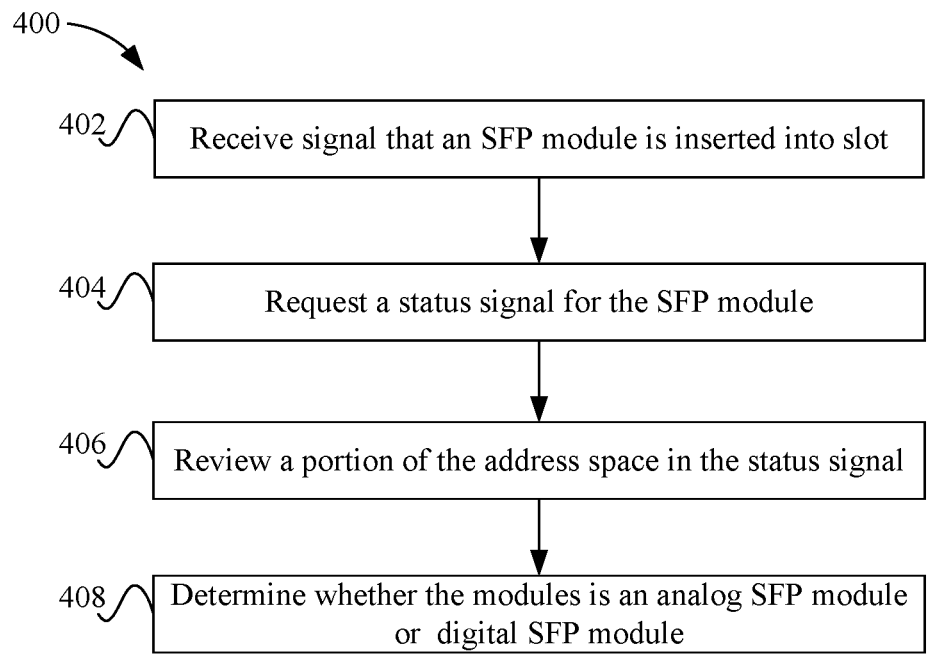
FIG. 4 depicts a simplified flowchart of a method for determining whether a module inserted into a slot is an analog SFP module or a digital SFP module according to some embodiments.

FIG. 4 depicts a simplified flowchart 400 of a method for determining whether a module inserted into a slot 202 is an analog SFP module or a digital SFP module according to some embodiments. At 402, processor 302 receives a signal that a module is inserted into slot 202. At 404, processor 302 receives a status signal for the SFP module. At 406, processor 302 may review a portion of the address space in the status signal. For example, information needed to determine whether the SFP module is an analog SFP module or a digital SFP module may be included in a portion of the 256 bytes of the bus address space. Processor 302 can detect the bytes in a 128 bit address space and determine whether the SFP module is a digital SFP module or an analog SFP module. Also, processor 302 may determine the bias voltage specified for the SFP module. Determining the bias voltage may allow processor 302 to use a specified power supply voltage for the SFP module 312. For example, processor 302 may dynamically configure the power supply voltage for different SFP modules to multiple values (e.g., more than two values). This may allow more flexibility for configuring the power supply voltage rather than having two power supply voltages for an analog SFP and a digital SFP module.

Referring back to FIG. 3, power supply controller 306 may send a power supply control message to power supply 310 when power supply controller 306 detects that SFP module 312 is an analog SFP module. This is because by default, power supply 310 may output a 3.3V power supply voltage (or some other voltage lower than 5V or 3.3V) to SFP module 312. In some embodiments, the power supply voltage may be output to pin 16 of SFP module 312, which may be the power supply pin for both the analog SFP module and the digital SFP module. Power supply controller 306 can send a signal to power supply 310 to increase the power supply voltage being output from 3.3V to 5.0V. Power supply 310 can then receive the input 5.3V signal and then output the 5.0V signal instead of the 3.3V signal. Then, the analog SFP module then receives the proper power supply voltage for its specification.

If the SFP module 312 was a digital SFP module, then power supply controller 306 may not change the voltage output by power supply 310. Although 3.3V voltage may be used as the default voltage, power supply 310 may output other voltages as the default voltage. For example, in other examples, the default voltage may be lower than 3.3V and power supply controller 306 can increase the voltage to 3.3V upon determining that the digital SFP module has been inserted into slot 202. In all cases, when an analog SFP module is inserted into slot 202, power supply controller 306 can increase the default voltage to 5.0V (or whatever the specified voltage is for the analog SFP module).

Accordingly, when a digital SFP module 312 is inserted into a slot that is configured for an analog SFP module, the digital SFP module will not be damaged by a power supply voltage that is higher than the digital SFP module is configured to receive. However, when an analog SFP module is correctly inserted into a slot for an analog SFP, processor 302 can increase the power supply voltage to the configured amount for the analog SFP. Digital SFPs that have the same packaging as analog SFPs, and may be mistakenly inserted into analog SFP slots, are thus not damaged. In some examples, analog SFPs will not be damaged if inserted into a digital SFP slot. Thus, processor 302 may not have a process to detect and change any power supply voltage for the slots configured to receive digital SFPs.

Figure 5:
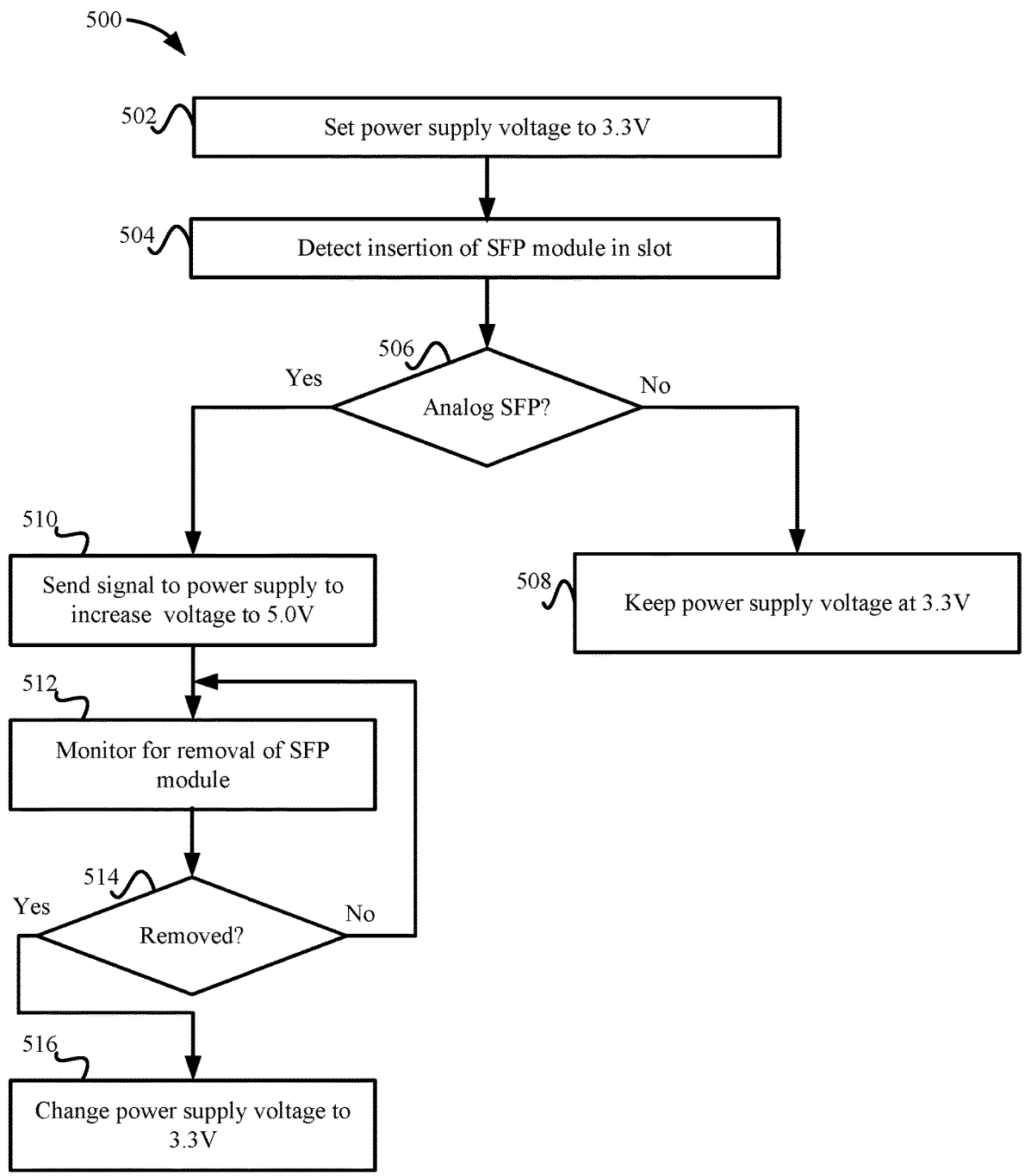
FIG. 5 depicts a simplified flowchart of a method for managing power supply voltages for a slot according to some embodiments.

FIG. 5 depicts a simplified flowchart 500 of a method for managing power supply voltages for a slot 202 according to some embodiments. As discussed above, the digital slots may not need to be managed as an analog SFP module that is inserted into a digital slot may not be damaged by the power supply voltage provided to that slot 202. At 502, processor 302 sets the power supply voltage output by power supply 310 to a default voltage, such as 3.3V. Then, at 504, processor 302 detects insertion of an SFP module 312 in slot 202. The detection may be through a status line that is connected to a pin of SFP module 312.

At 506, processor 302 determines whether or not the SFP module inserted into slot 202 is an analog SFP. If not, then at 508, processor 302 keeps the power supply voltage at 3.3V. For example, processor 302 may not perform any actions to change the power supply voltage.

If processor 302 detects that an analog SFP module was inserted into slot 202, at 510, processor 302 sends a signal to power supply 310 to increase the voltage to 5.0V. Then, power supply 310 increases the voltage from 3.3V to 5.0V, which is the configured voltage for an analog SFP module. The analog SFP module may then transmit or receive the analog signal as configured.

At 512, processor 302 monitors for removal of the SFP module 312. At 514, processor 302 determines if SFP module 312 was removed. When the SFP module 312 was removed, at 516, processor 302 changes the power supply voltage back to 3.3V. The changing of the power supply voltage back to 3.3V may be immediately performed to ensure that another SFP module 312 that is inserted into slot 202 may not be a digital SFP module, which can be damaged by the higher power supply voltage.

Accordingly, some embodiments provide protection for a slot 202 that may receive SFP modules that may not be configured for the slot. Due to having digital SFP modules and analog SFP modules being manufactured having similar packaging and a similar pin layout, it is possible that a slot 202 may have an SFP module inserted into it that is not configured to be inserted into that slot. Since the power supply pin for both modules is connected to the same connector, the higher voltage for the analog SFP module may damage the digital SFP module. Not damaging an erroneously inserted digital SFP module will save large replacement costs. Leveraging processor 302 to control power supply 310 in node 102 requires minimal cost because processor 302 is being used to configure other components of node 102, but the control of power supply 310 saves a large cost when mistakes are made by inserting a wrong SFP module into a slot 202.

System

Figure 6:
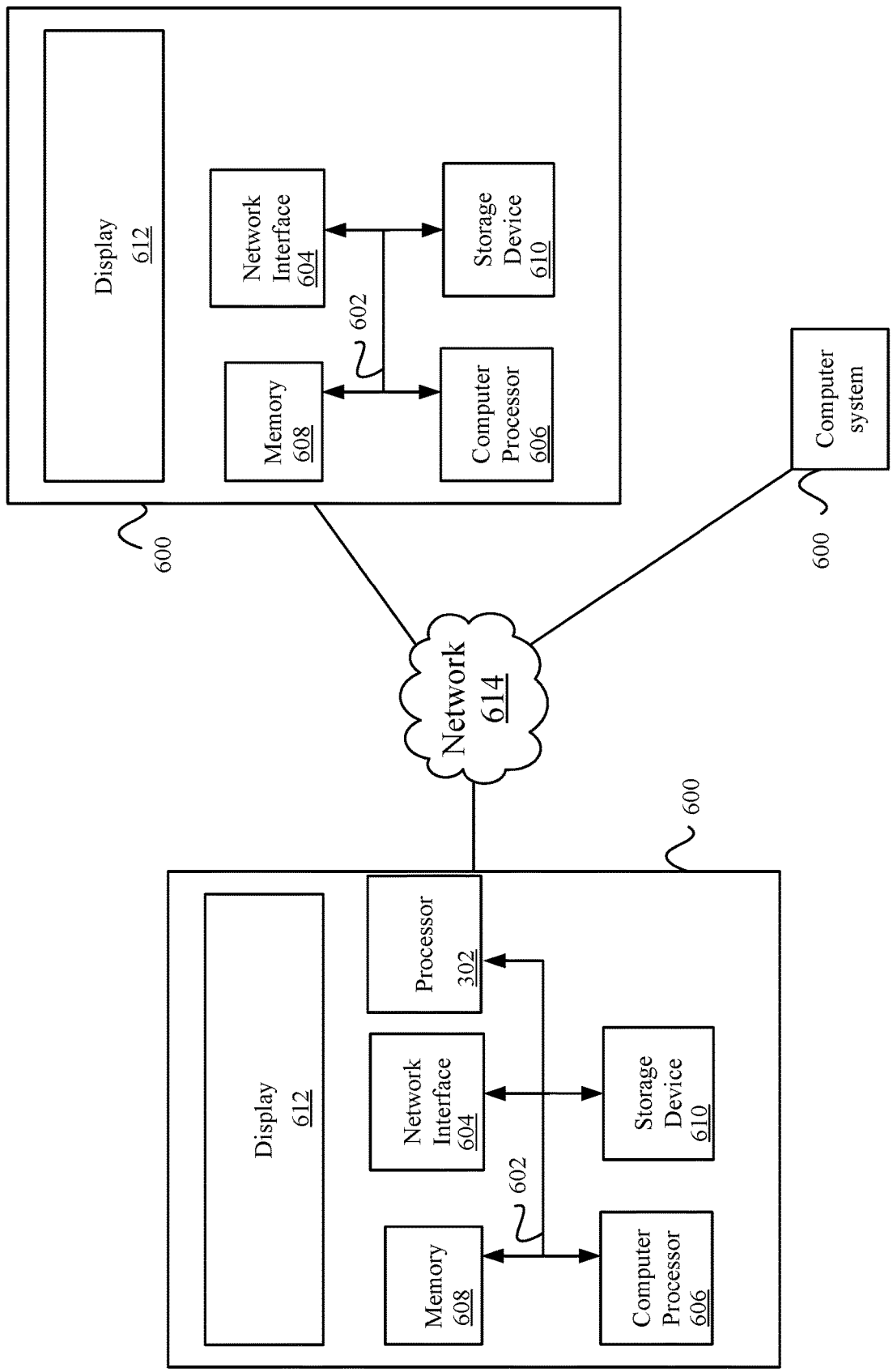
FIG. 6 illustrates an example of special purpose computer systems configured with a processor according to one embodiment.

FIG. 6 illustrates an example of special purpose computer systems 600 configured with a processor 302 according to one embodiment. Computer system 600 includes a bus 602, network interface 604, a computer processor 606, a memory 608, a storage device 610, and a display 612.

Bus 602 may be a communication mechanism for communicating information. Computer processor 606 may execute computer programs stored in memory 608 or storage device 608. Any suitable programming language can be used to implement the routines of some embodiments including C, C++, Java, assembly language, etc. Different programming techniques can be employed such as procedural or object oriented. The routines can execute on a single computer system 600 or multiple computer systems 600. Further, multiple computer processors 606 may be used.

Memory 608 may store instructions, such as source code or binary code, for performing the techniques described above. Memory 608 may also be used for storing variables or other intermediate information during execution of instructions to be executed by processor 606. Examples of memory 608 include random access memory (RAM), read only memory (ROM), or both.

Storage device 610 may also store instructions, such as source code or binary code, for performing the techniques described above. Storage device 610 may additionally store data used and manipulated by computer processor 606. For example, storage device 610 may be a database that is accessed by computer system 600. Other examples of storage device 610 include random access memory (RAM), read only memory (ROM), a hard drive, a magnetic disk, an optical disk, a CD-ROM, a DVD, a flash memory, a USB memory card, or any other medium from which a computer can read.

Memory 608 or storage device 610 may be an example of a non-transitory computer-readable storage medium for use by or in connection with computer system 600. The non-transitory computer-readable storage medium contains instructions for controlling a computer system 600 to be configured to perform functions described by some embodiments. The instructions, when executed by one or more computer processors 606, may be configured to perform that which is described in some embodiments.

Computer system 600 includes a display 612 for displaying information to a computer user. Display 612 may display a user interface used by a user to interact with computer system 600.

Computer system 600 also includes a network interface 604 to provide data communication connection over a network, such as a local area network (LAN) or wide area network (WAN). Wireless networks may also be used. In any such implementation, network interface 604 sends and receives electrical, electromagnetic, or optical signals that carry digital data streams representing various types of information.

Computer system 600 can send and receive information through network interface 604 across a network 614, which may be an Intranet or the Internet. Computer system 600 may interact with other computer systems 600 through network 614. In some examples, client-server communications occur through network 614. Also, implementations of some embodiments may be distributed across computer systems 600 through network 614.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
   detecting, by a computing device that includes a first slot and a second slot, a module that is inserted into the first slot of the computing device, wherein the first slot is configured to operate with a first type of module and the second slot is configured to operate with a second type of module, the first slot and the second slot including a same pin position for receiving a power supply pin from the first type of module and the second type of module;
   communicating, by the computing device, with the module to determine whether the module is the first type of module or the second type of module, the first type of module configured to receive a first type of signal that is combined with a second type of signal from the second type of module at the computing device; and
   adjusting, by the computing device, a power supply voltage to the power supply pin of the first slot from a first value to a second value when the first type of module is detected.

2. The method of claim 1, further comprising:
   setting the power supply voltage to the first value before detecting the module being inserted into the first slot.

3. The method of claim 1, wherein the first value is a default value when no module is inserted into the first slot.

4. The method of claim 1, further comprising:
   detecting when the module is removed from the first slot of the computing device; and
   changing the power supply voltage from the second value to the first value.

5. The method of claim 1, wherein the first type of module and the second type of module have a same pin type arrangement.

6. The method of claim 1, wherein the first type of module and the second type of module have the same pin layout dimensions.

7. The method of claim 1, wherein the first type of module and the second type of module have a same packaging design.

8. The method of claim 1, wherein the first slot and the second slot have a same pin type arrangement.

9. The method of claim 1, wherein the first type of module uses a higher power supply voltage than the second type of module.

10. The method of claim 1, wherein the first type of module uses a 5 volt power supply voltage and the second type of module uses a 3.3 volt power supply voltage.

11. The method of claim 1, wherein:
    the first type of module is configured to receive an analog signal; and
    the second type of module is configured to receive a digital signal.

12. The method of claim 11, wherein the computing device overlays the analog signal over an analog signal that is converted from the digital signal, and outputs the combined signal.

13. The method of claim 1, wherein adjusting the power supply voltage comprises:
    outputting a signal to a power supply to adjust the power supply voltage to the second value.

14. The method of claim 1, wherein detecting the module is inserted comprises:
    receiving a signal from a pin connected to the module indicating the module is inserted into the first slot.

15. The method of claim 1, wherein communicating with the module comprises:
    receiving a signal from the module indicating a device type; and
    analyzing the signal to determine that the device type is the first type of module.

16. The method of claim 1, wherein the first slot is not configured to operate with the second type of module and process the second type of signal.

17. A non-transitory computer-readable storage medium containing instructions that, when executed, control a computer system to be configured for:
    detecting, in the computer system that includes a first slot and a second slot, a module that is inserted into the first slot of the computer system, wherein the first slot is configured to operate with a first type of module and the second slot is configured to operate with a second type of module, the first slot and the second slot including a same pin position for receiving a power supply pin from the first type of module and the second type of module;
    communicating with the module to determine whether the module is the first type of module or the second type of module, the first type of module configured to receive a first type of signal that is combined with a second type of signal from the second type of module at the computer system; and
    adjusting a power supply voltage to the power supply pin of the first slot from a first value to a second value when the first type of module is detected.

18. The non-transitory computer-readable storage medium of claim 17, further configured for:
    setting the power supply voltage to the first value before detecting the module being inserted into the first slot.

19. The non-transitory computer-readable storage medium of claim 18, further configured for:
    detecting when the module is removed from the first slot of the computing device; and
    changing the power supply voltage from the second value to the first value.

20. An apparatus comprising:
    one or more computer processors; and
    a non-transitory computer-readable storage medium comprising instructions, that when executed, control the one or more computer processors to be configured for:
    detecting, in the apparatus that includes a first slot and a second slot, a module that is inserted into the first slot of the apparatus, wherein the first slot is configured to operate with a first type of module and the second slot is configured to operate with a second type of module, the first slot and the second slot including a same pin position for receiving a power supply pin from the first type of module and the second type of module;
    communicating with the module to determine whether the module is the first type of module or the second type of module, the first type of module configured to receive a first type of signal that is combined with a second type of signal from the second type of module at the apparatus; and
    adjusting a power supply voltage to the power supply pin of the first slot from a first value to a second value when the first type of module is detected.

* * * * *